United States Patent [19]

Moulton et al.

[11] Patent Number: 5,441,830

[45] Date of Patent: Aug. 15, 1995

[54] ELECTRICALLY-CONDUCTING ADHESION-PROMOTERS ON CONDUCTIVE PLASTIC

[76] Inventors: Russell D. Moulton, 6316 Felder Dr., San Jose, Calif.; Milton N. Golovin, 145 Manton Dr., San Jose, Calif. 95123

[21] Appl. No.: 305,684

[22] Filed: Sep. 13, 1994

Related U.S. Application Data

[63] Continuation of Ser. No. 968,172, Oct. 29, 1992, abandoned.

[51] Int. Cl.⁶ .............................. H01M 4/60
[52] U.S. Cl. ................ 429/212; 429/233; 429/245
[58] Field of Search .......... 429/212, 233, 245

[56] References Cited

U.S. PATENT DOCUMENTS

| | | | |
|---|---|---|---|
| 3,656,027 | 4/1972 | Isley | 317/230 |
| 4,092,464 | 5/1978 | Dey et al. | 429/127 |
| 4,214,969 | 7/1980 | Lawrance . | |
| 4,239,837 | 12/1980 | Hartmann et al. . | |
| 4,339,322 | 7/1982 | Balko et al. | 204/255 |
| 4,416,915 | 11/1983 | Palmer et al. . | |
| 4,461,814 | 7/1984 | Klinedinst . | |
| 4,504,557 | 3/1985 | Filatovs et al. . | |
| 4,518,665 | 5/1985 | Fujita et al. . | |
| 4,525,439 | 6/1985 | Simonton . | |
| 4,540,641 | 9/1985 | McDonald et al. . | |
| 4,565,751 | 1/1986 | Faust et al. . | |
| 4,585,711 | 4/1986 | Vaidyanathan . | |
| 4,717,634 | 1/1988 | Daifuku et al. . | |
| 4,731,311 | 3/1988 | Suzuki et al. . | |
| 4,772,517 | 9/1988 | Muenstedt et al. . | |
| 4,810,755 | 3/1989 | Akazawa et al. | 525/285 |
| 4,824,745 | 4/1989 | Ogawa et al. . | |
| 4,865,932 | 9/1989 | Masuda et al. . | |
| 4,925,752 | 5/1990 | Fauteux et al. | 429/191 |
| 4,939,050 | 7/1990 | Toyosawa et al. . | |
| 4,990,413 | 2/1991 | Lee et al. | 429/191 |
| 5,011,501 | 4/1991 | Shackle et al. . | |
| 5,013,620 | 5/1991 | Miyazaki et al. . | |
| 5,040,562 | 8/1991 | Achterholt | 137/227 |
| 5,066,556 | 11/1991 | Toyosawa et al. . | |
| 5,108,855 | 4/1992 | Daifuku et al. . | |
| 5,227,264 | 7/1993 | Duval et al. . | |

FOREIGN PATENT DOCUMENTS

| | | |
|---|---|---|
| 1264804 | 1/1990 | Canada . |
| 62-160656 | 7/1987 | Japan . |

*Primary Examiner*—José Dees
*Assistant Examiner*—Samuel Barts
*Attorney, Agent, or Firm*—Gerald Swiss

[57] ABSTRACT

Disclosed are methods for enhancing the adhesion of composite electrodes onto conductive plastic foils (e.g., current collectors). Also disclosed are electrochemical cells produced from these foils.

3 Claims, No Drawings

ELECTRICALLY-CONDUCTING ADHESION-PROMOTERS ON CONDUCTIVE PLASTIC

This application is a continuation of application Ser. No. 07/968,172, filed Oct. 29, 1992 now abandoned.

BACKGROUND OF THE INVENTION

1. Field of the Invention

This invention is directed to methods for enhancing the adhesion of composite electrodes onto conductive plastic foils useful as current collectors, to the foils prepared by these methods and to electrochemical cells produced from these foils.

2. State of the Art

Electrochemical cells comprise a cathode, an anode and an electrolyte interposed therebetween. The electrochemical cells are often defined as liquid or solid cells and this refers merely to whether the electrolyte interposed between the anode and the cathode is a liquid or a solid. Solid electrochemical cells are well known in the art and present many advantages over conventional liquid batteries such as improved safety features, lighter weight, etc.

In order to enhance the overall current produced by solid or liquid batteries, it is conventional to employ several electrochemical cells in a battery. When so employed, the current from each of the cells is accumulated so that the total current generated by the battery is roughly the sum of the current generated from each of the individual electrochemical cells employed in the battery.

One method for accumulating the current from individual electrochemical cells is by using a current collector attached to the cathode or the anode of the electrochemical cell. Typically, the current collector is a metal foil or a conductive plastic which is coupled to other current collectors in the battery so that the current generated by each cell is collected and accumulated over all of the cells. Thus, the total current generated by the battery is a summation of the current generated by each of the electrochemical cells employed in the battery minus whatever current is lost due to resistance in the current collector.

Notwithstanding the benefits of using current collectors in electrochemical cells, metal foil current collectors are heavier than conductive plastic foil current collectors and adversely increase the weight of the battery. On the other hand, when conductive plastic foils are used as the current collector, they are in direct contact with a composite electrode and are suspectable to swelling due to contact of the current collector with the electrolytic solvent found in the electrode. Such swelling adversely affects the performance of the battery.

Additionally, some conductive plastic foil current collectors possess a relatively non-adherent surface which retards the attachment of a composite electrode to the surface of the current collector. Specifically, composite electrodes are typically prepared from a paste which is applied onto the surface of the current collector by conventional means such as extrusion and then cured to form a solid composite electrode. When the surface of the current collector is non-adherent, then during application of a paste onto the foil, the paste can become dislodged from the foil. In turn, after curing, such dislodgement will result in defects in collecting current from that cell.

This invention is directed to the discovery that the inclusion of a layer of electrically-conducting adhesion-promoter to the surface of conductive plastic foil current collector provides a means to both increase the adherence of the electrode to the foil and to retard contact of the electrolytic solvent with the plastic foil.

Thus, while the art discloses that polymers containing grafted acid functionalities (i.e., maleic acid or anhydride) have improved adherence (see U.S. Pat. Nos. 4,810,755 and 4,857,600 as well as International Patent Application Publication No. WO 91/02760), there is nothing in the art which discloses the use of a layer of an electrically-conductive adhesion promoter to the surface of the plastic foil.

SUMMARY OF THE INVENTION

This invention is directed to the novel and surprising discovery that the surface of conductive plastic foil current collectors can be modified to be more adherent to an electrode paste by placing a layer of an electrically-conducting adhesion-promoter onto the surface of the current collector which is to be interposed between the foil and the electrode paste.

Additionally, because this layer of electrically-conducting adhesion-promoter is interposed between the composite electrode and the conductive plastic current collector, contact of the composite electrode with the conductive plastic current collector is prevented. This, in turn, retards any contact of the electrolytic solvent in the composite electrode with the current collector thereby inhibiting swelling of the conductive plastic current collector.

The electrically-conducting adhesion-promoter is a solid polymeric layer which comprises an effective amount of a conductive material so as to render the polymeric layer conductive, a polymer and acid functionalities. Without being limited to any theory, it is believed that the acid functionalities of the solid polymer composition provide in situ for adhesive/binding functionalities which, when contacting the conductive plastic foil, enhance the adherence of the foil to the adhesion-promoter layer. Additionally, the surface of this adhesion-promoter layer is characterized on a microscopic level by peaks and valleys rather than a smooth planar surface and, accordingly, provides an adherent surface for the composite electrode.

Surprisingly, the inclusion of an effective amount of a conductive material in the polymeric layer does not interfere with the enhanced adherence of this layer to the conductive plastic foil.

In view of the above, in one of its composition aspects, this invention is directed to a conductive plastic foil containing on one of its surfaces a layer of an electrically-conducting adhesion-promoter comprising:

from about 30 to 80 weight percent of a conductive material;

from about 20 to about 70 weight percent of a prepolymer or polymer thereof;

and an effective amount of acid functionalities so as to enhance the adherence of this layer of electrically-conducting adhesion-promoter to the surface of the conductive plastic foil.

Upon application to the surface of the conductive plastic foil current collector, this layer is typically a paste or a colloidal suspension which is applied onto the foil by conventional application techniques such as extrusion, roll coating, etc.

Pastes and colloidal suspensions are formed by conventional techniques. For example, prepolymers are typically liquids which, when combined with requisite amounts of conductive material, form a paste or colloidal suspension suitable for application onto a conductive plastic foil. Conventional curing techniques then transform the paste or colloidal suspension to a solid polymeric matrix on the surface of the foil.

On the other hand, polymers can be dissolved into a compatible solvent or melt at an elevated temperature to provide a liquid ("hot-melted"). When combined with requisite amounts of conductive material, the liquid forms a paste or colloidal suspension suitable for application onto the conductive plastic foil current collector. Removal of the solvent or cooling of the melted polymer results in the formation of a solid polymeric matrix on the surface of the foil.

In another of its composition aspects, this invention is directed to an electrode/current collector comprising a conductive plastic foil suitable for use as a current collector, a layer of a solid polymeric matrix, electrically-conducting, adhesion-promoter formed on at least one surface of the foil which comprises from about 30 to 80 weight percent of a conductive material; from about 20 to about 70 weight percent of a polymer derived from a solid matrix forming monomoer or partial polymer thereof; and an effective amount of acid functionalities so as to enhance the adherence of this layer of electrically-conducting adhesion-promoter to the surface of the foil; and a composite electrode.

In another of its composition aspects, this invention is directed to an electrochemical cell comprising:

a conductive plastic foil suitable for use as a current collector, a layer of a solid polymeric matrix, electrically-conducting, adhesion promoter comprising from about 30 to 80 weight percent of a conductive material; from about 20 to about 70 weight percent of a polymer derived from solid matrix forming monomer or partial polymer thereof; and an effective amount of acid functionalities so as to enhance the adherence of this layer of electrically-conducting adhesion-promoter to the surface of the foil;

a composite cathode;

an electrolyte; and an anode;

wherein the layer of said solid polymeric matrix, electrically-conducting, adhesion promoter is interposed between the foil and the composite cathode and further wherein the electrolyte is interposed between the composite cathode and the anode.

In one of its method aspects, this invention is directed to a method for modifying the surface of a conductive plastic foil current collector to render it more adherent to a composite electrode and less suspectible to swelling when contacting a composite electrode which method comprises:

(a) selecting a conductive plastic foil suitable for use as a current collector;

(b) applying a layer of an electrically-conducting adhesion-promoter onto said foil which layer comprises:

from about 30 to 80 weight percent of a conductive material;

from about 20 to about 70 weight percent of a compound selected from the group consisting of a solid matrix forming monomer, a partial polymer of a solid matrix forming monomer, a hot-melt polymer derived from a solid matrix forming monomer or partial polymer thereof, and a solution comprising a polymer derived from a solid matrix forming monomer or partial polymer thereof; and an effective amount of acid functionalities so as to enhance the adherence of this layer of electrically-conducting adhesion-promoter to the surface of the foil, and (c) converting the layer formed in step (b) above to a solid polymeric matrix, electrically-conducting, adhesion-promoter layer.

Preferably, the acid functionalities are selected from the group consisting of carboxylic groups (—COOH) and sulfonic groups (—SO$_3$H).

The electrolyte employed in the electrochemical cell is either a liquid or solid electrolyte but preferably is a solid electrolyte.

Preferably, the layer of solid polymeric matrix, electrically-conducting, adhesion-promoter is no more than 100 microns ($\mu$m) in thickness and more preferably is from about 100 Angstroms to about 20 $\mu$m in thickness and even more preferably is from about 0.1 $\mu$m to about 10 $\mu$m in thickness.

DETAILED DESCRIPTION OF THE PREFERRED EMBODIMENTS

As noted above, this invention is directed, in part, to conductive plastic foil current collectors which have been modified so as to improve their adherence properties to a composite electrode and to retard contact of the electrolytic solvent with the plastic foil. However, prior to describing this invention in further detail, the following terms will first be defined.

DEFINITIONS

As used herein, the following terms have the following meanings.

The term "conductive plastic foil" refers to any plastic foil which has been doped with a sufficient amount of a conductive material so as to be conductive and therefore act as a current collector in an electrochemical cell. Suitable conductive plastic foils are well known in the art and include, by way of example, commercially available conductive plastic foils such as those available from Southwall Technologies, Palo Alto, Calif. under the tradename SOUTHWALL SILVER REFLECTOR FILM. Other conductive plastic foils are commercially available from Graphics Technology International, South Hadley, Mass.

The particular conductive plastic employed is not critical and include, by way of example, polyesters, polycarbonates, polyacrylates, polyethylenes, polypropylenes and the like. Typically, the plastic is of sufficient molecular weight to impart structural rigidity to the plastic. Preferably, the plastic has a molecular weight of at least about 10,000 and more preferably, from about 10,000 to about 5,000,000.

The plastic is doped with a sufficient amount of a conductive material to render the plastic conductive. Such conductive materials include, by way of example, carbon powder, graphite, powdered nickel, metal particles, conductive polymers (i.e., characterized by a conjugated network of double bonds like polypyrol and polyacetylene), and the like.

The conductive plastic can be continuous and cover the entire surface of the current collector or non-continuous and not cover the entire surface of the current collector. Examples of non-continuous current collectors include non-conductive plastics having conductive plastic tabs inserted therein wherein the tabs act as the current collector.

The term "solid polymeric matrix" refers to a material which is compatible with acid functionalities and which is formed by polymerizing a prepolymer (as defined below) and, when used in combination with an effective amount of a conductive material, is conductive. The solid polymeric matrix may or may not be ion-conducting but, preferably, is not ionically conducting (i.e., does not conduct alkali metal or alkaline earth metal cations).

The term "compatible with acid functionalities" means that the presence of acid functionalities in the solid polymeric matrix neither renders the solid polymeric matrix unsuitable for use in electro-chemical cells nor results in a significant degradation of the solid matrix.

The term "a solid matrix forming monomer" refers to organic materials which in monomeric form can be polymerized to form solid polymeric matrices and which are electrically conducting when combined with an effective amount of a conductive material and further which, when polymerized, are compatible with acid functionalities. Suitable solid matrix forming monomers are well known in the art and the particular monomer employed is not critical.

Preferably, the solid matrix forming monomers do not contain hetero atom functionalities capable of forming donor acceptor bonds with inorganic cations so as to render the solid matrix ion-conducting (i.e., able to conduct alkali metal or alkaline earth metal cations). Ion-conducting hetero atom functionalities in solid polymeric matrices include, by way of example, ether groups, amine groups, and the like. On the other hand, hetero atom functionalities such as carboxylic acid groups, sulfonic acid groups, etc., are not ion-conducting in solid polymeric matrices because these functionalities bind too tightly with the cations.

Examples of suitable solid matrix forming monomers include, by way of example, acrylic acid ($CH_2=CHCOOH$), chloroacrylic acid ($ClCH=CHCOOH$), bromoacrylic acid ($BrCH=CHCOOH$), crotonic acid ($CH_3CH=CHCOOH$), propylene ($CH_3CH=CH_2$), ethylene ($CH_2=CH_2$), butylene ($CH_3CH_2CH=CH_2$), ethyleneimine

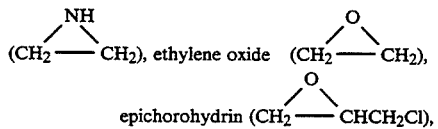

acryloyl-derivatized polyalkylene oxides (as disclosed in U.S. Pat. No. 4,908,283), urethane acrylate, vinyl sulfonate polyalkylene oxides (as disclosed in U.S. Ser. No. Pat. No. 5,262,253 which patent is incorporated herein by reference in its entirety), and the like as well as mixtures thereof.

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymers" refers to solid matrix forming monomers and/or partial polymers thereof.

The term "acid functionalities" refers to art recognized acid containing functional groups capable of covalently binding to an organic residue (i.e., a hydrocarbyl group) including, by way of example, carboxylic acid groups (—COOH), sulfonic acid groups (—$SO_3H$), and the like.

The acid functionalities can be incorporated directly into the solid polymeric matrix either as a homopolymer (e.g., polyacrylic acid) or as a copolymer, terpolymer, etc. wherein at least one of the components of the copolymer, terpolymer, etc. is a solid matrix forming monomer containing acid functionality (e.g., acrylic acid, vinyl sulfonic acid, etc.). Depending upon the particular monomers, the copolymers, terpolymers, etc. employed can be random copolymers, terpolymers, etc. or can be blocked copolymers, blocked terpolymers, etc.

The polymer in the solid polymeric matrix can also be derivatized to contain acid functionality. For example, maleic anhydride, acrylic acid or methacrylic acid and the like can be grafted onto a polymer via a free-radical reaction and subsequent hydrolysis will provide for carboxylic acid functionality on the polymer. See, for example, U.S. Pat. Nos. 4,810,755 and 4,857,600 and International application No. WO 91/02760 which are incorporated herein by reference in their entirety.

Alternatively, the solid polymeric matrix can employ a mixture of polymers wherein at least one of the polymeric components of the mixture contains acid functionality (e.g., a mixture of polyacrylic acid and polyethylene) or can employ a mixture of a non-acid containing polymer or polymers and a non-polymeric acid component. In this regard, the non-polymeric acid component preferably has a boiling point of greater than about 80° C. and is compatible with the polymer.

Compatible non-polymeric acid components are those which are miscible with the polymer and do not readily diffuse from the layer of electrically-conducting adhesion-promoter into the electrode. Preferably, the non-polymeric acid component is substantially non-diffusive into the electrode and more preferably has a diffusion coefficient into the electrode of less than $10^{-6}$ centimeters$^2$/ second.

The particular non-polymeric acid component employed is not critical and includes, by way of example, abietic acid, decanoic acid, stearic acid, linolenic acid, palmitic acid, oleic acid, succinic acid, maleic acid, menadiol diphosphoric acid, phthalic acid, 1-hexadecane sulfonic acid, etc. Preferably, the acid containing component is represented by the formula $R(COOH)_n$ wherein R is a hydrocarbyl group of from 3 to 50 carbon atoms and n is an integer from about 1 to 7.

The term "cured" or "cured product" refers to the treatment of the prepolymer under polymerization conditions (including cross-linking) so as to form a solid polymeric matrix. Suitable polymerization conditions are well known in the art and include by way of example, heating the monomer, irradiating the monomer with electron beams, and the like, etc. The resulting cured product is preferably free of hetero atom functional groups which are capable of conducting inorganic cations.

The term "inorganic cations" refers to the cationic portion of an inorganic salt which is suitable for use in an electrolyte and in the composite electrodes of an electrochemical cell. The particular inorganic ion salt employed is not critical and examples of suitable inorganic ion salts include, by way of example, $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$, $AgNO_3$, $CuCl_2$, $Mg(ClO_4)_2$ and the like. The inorganic cation is preferably selected from the group consisting of Li, Na, K, Cs, Ag, Cu and Mg.

The term "electrolytic solvent" refers to the solvent (i.e., plasticizer) added to the composite electrode and the electrolyte for the purpose of solubilizing inorganic ion salts during operation of the electrochemical cell. The solvent can be any low volatile aprotic polar solvent. Preferably, these materials are characterized by a boiling point greater than about 80° C. In this regard, low volatility for the electrolyte solvent simplifies manufacture of the electrolyte/batteries and improves their self-life.

If the solid polymeric matrix for the electrode is formed by radiation polymerization of the solid matrix forming monomer or partial polymer thereof, then the solvent should be radiation inert at least up to the levels of radiation employed. If the solid polymeric matrix is formed by thermal polymerization, the solvent should be thermally inert at least up to the temperatures of thermal polymerization. Additionally, the solvent should not scavenge free radicals.

Representative examples of suitable solvents include propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like, and mixtures thereof. A particularly preferred solvent is a mixture of an organic carbonate and triglyme as disclosed in U.S. patent application Ser. No. 07/918,509 filed as Attorney Docket No. 028574-026 and entitled "SOLID, SOLVENT-CONTAINING ELECTROLYTES AND ELECTROLYTIC CELLS PRODUCED THEREFROM" which application is incorporated herein by reference in its entirety.

The term "electrochemical cell" refers to primary and secondary electrochemical cells comprising an anode, a cathode, and an ion-conducting electrolyte interposed therebetween. The ion-conducting electrolyte can be either a liquid or a solid electrolyte but solid electrolytes are preferred and more preferably, the electrochemical cell is a solid secondary cell.

The anode is typically comprised of a compatible anodic material which is any material which functions as an anode in an electrochemical cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like.

The cathode comprises a compatible cathodic material which refers to any material which functions as a positive pole (cathode) in an electrochemical cell. Such compatible cathodic materials are well known in the art and include, by way of example, manganese dioxide, molybdenum trioxide, sulfides of titanium and niobium, chromium oxide, copper oxide, vanadium oxides such as $V_2O_5$, $V_6O_{13}$, $LiV_3O_8$ and the like. The particular compatible cathodic material employed is not critical. When the electrochemical cell is a secondary cell, then the compatible cathodic material employed is one which is capable of being recharged (e.g., $LiV_3O_8$, $V_6O_{13}$, $MoO_3$, and the like).

The term "composite electrode" refers to cathodes and anodes wherein the cathode is comprised of materials other than compatible cathodic materials and the anode is comprised of materials other than compatible anodic materials. Typically, the composite contains a polymer which acts to bind the composite materials together and an electrolytic solvent.

Composite cathodes are well known in the art. For example, a composite cathode can comprise a compatible cathodic material, a conductive material, an electrolytic solvent, an alkali salt, and a solid matrix forming polymer.

Composite anodes are also well known in the art. For example, a composite anode can comprise a compatible intercalation anodic material, an electrolytic solvent and a solid matrix forming polymer.

Because polymers typically do not have sharply defined melting points, the term "liquid" as it applies to hot melts of polymers includes polymers in a condition where they can be mixed with a conductive material and, if necessary, a component or components containing acid functionality.

METHODOLOGY

The layer of electrically-conducting adhesion-promoter applied to the surface of the conductive plastic foil is readily prepared by a variety of methods.

Specifically, one method for preparing the layer of electrically-conducting adhesion-promoter is to use a suitable prepolymer which contains acid functionality. The preparation of suitable prepolymers containing acid functionality are well known in the art and certain of these prepolymers are commercially available. For example, acrylic acid, chloroacrylic acid, bromoacrylic acid, crotonic acid, and vinyl sulfonic acid are commercially available (e.g., from Aldrich Chemical Company) or are commercially available as salts which can be readily converted to the acid. The prepolymer can be used either by itself so as to provide for a homopolymer upon curing or can be used with other prepolymers to provide for a copolymer, terpolymer, etc. upon curing. In this latter embodiment, it is necessary that only one of the prepolymers contain acid functionality.

Prepolymers containing acid functionality are typically liquid and are then mixed either neat or in a solvent with a conductive material to provide for a composition which is typically a paste or a colloidal suspension. Suitable conductive materials are well known in the art and include, by way of example, carbon powder, graphite, powdered nickel, metal particles, conductive polymers (i.e., characterized by a conjugated network of double bonds like polypyrol and polyacetylene), and the like.

The resulting composition is then applied onto the surface of the conductive plastic foil. When a solvent is employed, it is removed by evaporation. The composition is cured by conventional techniques to form a solid layer of electrically-conducting adhesion-promoter on the surface of the current collector. For example, when the prepolymer contains a reactive double bond, the composition can be cured by suitable curing methods which include heating, irradiation with electron beams (EB), etc. When the composition is cured by heating, the composition preferably contains an initiator which is typically a peroxide such as benzoyl peroxide, methyl ethyl ketone peroxide, t-butyl peroxypyvarate, diisopropyl peroxycarbonate, and the like.

The initiator is generally employed in an amount sufficient to catalyze the polymerization reaction. Preferably, the initiator is employed at up to about 1 weight percent based on the weight of the prepolymer.

When curing is by EB treatment, an initiator is not required.

In either case, the resulting solid polymeric matrix is a homogeneous, single phase material which is maintained upon curing, and does not readily separate upon cooling to temperatures below room temperature.

Another method for preparing the layer of electrically-conducting adhesion-promoter is to employ an acid containing polymer derived from a prepolymer such as acrylic acid, chloroacrylic acid, bromoacrylic acid, crotonic acid, and vinyl sulfonic acid. The prepolymer can be polymerized to form a homopolymer or copolymers, terpolymers, etc. by methods well known in the art. As noted above, the prepolymer can be used either by itself so as to provide for a homopolymer upon curing or can be used with other prepolymers to provide for a copolymer, terpolymer, etc. upon curing. In this latter embodiment, it is necessary that only one of the prepolymers contain acid functionality. Additionally, it is possible to use a mixture of polymers in the composition. In this embodiment, it is necessary that only one of the polymers is an acid containing polymer (e.g., a 1:1 mixture of polyethylene and polyacrylic acid).

The acid containing polymer is then mixed with a conductive material in any of a number of art recognized methods. For example, the polymer can be dissolved into a suitable solvent, preferably an aprotic solvent, and then the conductive material added. The resulting composition can then be applied to the surface of the conductive plastic foil and the solvent evaporated to provide for a layer of electrically-conducting adhesion-promoter on the surface of the current collector. If a protic solvent is employed, the resulting current collector is preferably dried at an elevated temperature for a prolonged period of time to reduce the level of protic solvent remaining in the electrically-conducting adhesion-promoter layer preferably to a level of less than about 30 $\mu g/cm^2$ and more preferably less than 10 $\mu g/cm^2$ and even more preferably less than about 5 $\mu g/cm^2$. The specific temperature used during the drying step is selected relative to the electrically-conducting adhesion-promoter layer and conductive plastic current collector employed. In particular, the drying step is conducted at an elevated temperature below the melting point of both the adhesion-promoter layer and the conductive plastic current collector.

When a solvent is employed to dissolve the polymer used in the adhesion-promoter layer, it is of course selected to be inert to the conductive plastic current collector. For example, if the current collector contains polybutylene, then water can be used to dissolve a polymer such as polyacrylic acid which is used in the adhesion-promoter layer.

Alternatively, the polymer containing the acid functionality can be hot-melted at an elevated temperature and then the requisite amount of conductive material is mixed into the polymer. The resulting composition is then applied onto the conductive plastic foil and cooled to provide for a layer of electrically-conducting adhesion-promoter on the surface of the current collector. If a hot-melted polymer is employed, the temperature of the hot melted polymer is selected so as not to melt the conductive plastic current collector.

Appropriate selection of the solvent or temperature of the melted polymer is well within the skill of the art.

Acid containing polymers are well known in the art and can be prepared by well known methods. In fact, some acid containing polymers are commercially available. For example, several polyacrylic acids (of varying molecular weight) are commercially available from Aldrich Chemical Company, Milwaukee, Wis., as well as are polyvinylsulfonic acid, polyvinyl sulfate, poly(3-hydroxybutyric acid) and copolymers of poly(3hydroxybutyric acid) and poly(3-hydroxyvaleric acid). Additionally, Sarbox resins, carboxylic acid containing resins, are commercially available from Sartomer Chemicals, Exton, Pa.

Another method for preparing the layer of electrically-conducting adhesion-promoter is to modify a polymer not containing acid functionality so as to introduce acid functionality. Specifically, reactions resulting in the addition of carboxylic acid functionality onto polymers are well known in the art. For example, the reaction of maleic anhydride with polymers containing a double bond such as polybutene, polypropylene, polyalphaolefins, etc. is described in U.S. Pat. Nos. 3,018,250; 3,024,195; 4,234,435; 4,388,471; and 4,450,281. Each of these patents are incorporated herein by reference in their entirety.

Additionally, free radical grafting of maleic anhydride, maleic acid, acrylic acid and methylacrylic acid onto polymers is also well known in the art and is described in U.S. Pat. Nos. 4,857,600 and 4,810,755 as well as in International Patent Application Publication No. WO 91/02760. Each of these references are incorporated herein by reference in their entirety.

In either case, the reactions lead to either the incorporation of a single succinic anhydride or maleic anhydride group or the incorporation of multiple such groups onto the polymer. The anhydride groups can then be hydrolyzed under suitable hydrolysis conditions to provide for the corresponding acid functionalities.

Likewise, the addition of sulfonic acid groups to polymers of butylene, propylene, etc. are well known in the art.

After the acid functionality has been added to the polymer, the polymer can be mixed with a conductive material in the same manner described above with acid containing polymers.

In still another embodiment, a non-polymerizable component containing acid functionality (a non-polymeric acid component) can be added to a polymer or prepolymer to form a composite comprising the non-polymeric acid component, the polymer, and the conductive material. Specifically, a nonpolymeric acid component can be added directly to the composition of the prepolymer and the conductive material. The resulting composition is then applied to the surface of the conductive plastic foil and cured so as to provide for a layer of electrically-conducting adhesion-promoter on the surface of the foil.

Alternatively, the non-polymeric acid component can be mixed in a hot-melt of a polymer or dissolved into a mutual solvent (preferably an aprotic solvent) with the polymer. After addition of the conductive material, a layer of the resulting mixture is applied onto the substrate via conventional techniques (e.g., extrusion, roll coating, etc.). Cooling or evaporation then affords a layer of electrically-conducting adhesion-promoter on the surface of the current collector. If a protic solvent is employed, evaporation is preferably conducted at an elevated temperature for a prolonged period of time to reduce the level of protic solvent in the electrically-conducting adhesion-promoter layer.

Preferably, the non-polymeric acid component has a boiling point of greater than about 80° C. and is compatible with the polymer. The particular acid-containing, non-polymeric component employed is not critical and includes, by way of example, stearic acid, palmitic acid, oleic acid, succinic acid, maleic acid, monodiol diphosphoric acid, phthalic acid, 1-hexadecane sulfonic acid, and the like.

Regardless of the method in which the acid functionality is incorporated into the composition, sufficient acid functionality is incorporated so as to enhance the adherence of the layer of the electrically-conducting adhesion-promoter to the surface of the conductive plastic foil and sufficient conductive material is added to render the resulting solid polymeric matrix electrically conducting.

Preferably, the amount of conductive material employed is from about 30 to about 80 weight percent of the composition and more preferably, from about 40 to about 60 weight percent of the composition.

Preferably, sufficient acid functionality is incorporated into this composition so that the composition has an acid number of at least 0.01 milliequivalents per gram and, more preferably, from about 1 to about 250 milliequivalents per gram, and even more preferably, from about 10 to about 150 milliequivalents per gram.

The term "acid number" refers to the amount of acid equivalent in milliequivalents of proton in 1 gram of the composition and is reported as milliequivalents per gram. The acid number for this composition is readily determined by ASTM test number D664.

The layer of electrically-conducting adhesion-promoter is applied by well known conventional techniques onto the conductive plastic foil. For example, pastes can be applied by extrusion whereas dispersed colloidal solutions can be applied by dipping, painting, spraying, gravuring, roll coating, including reverse roll coating, doctor blades, and the like. The particular method employed is not critical.

After application, the layer of electrically-conducting adhesion-promoter is treated to convert this layer to a solid, electrically-conducting, polymeric matrix. Such conversion is accomplished by reference to the layer applied. For example, if the layer contains a prepolymer, then the conversion includes a curing step to convert the prepolymer to a polymer so as to provide for the solid, polymeric matrix. Likewise, if the layer contains a polymer in solution, then the conversion includes an evaporation step wherein the solvent is removed so as to provide for the solid, polymeric matrix. Lastly, if the layer contains a hot-melted polymer, then the conversion includes a cooling step wherein the polymeric composition is solidified so as to provide for the solid, polymeric matrix.

After conversion, the resulting solid polymeric matrix preferably has a thickness of from at least one molecule to no more than about 100 μm. More preferably, this matrix has a thickness of from about 100 Angstroms to about 20 μm in thickness and even more preferably is from about 0.1 μm to about 10 μm in thickness.

Preferably, the polymer in the solid polymeric matrix has a molecular weight of at least about 10,000 regardless of whether the polymer is formed in situ or if a preformed polymer is used to prepare the layer of electrically-conducting adhesion-promoter. More preferably, the polymer has a molecular weight of at least about 50,000 and still more preferably has a molecular weight of at least about 90,000. The upper limit for the molecular weight of the polymer is not critical but preferably is no more than about 5,000,000.

After formation of the solid polymeric matrix, electrically-conducting, adhesion-promoter layer on the surface of the current collector, a composite electrode is then applied thereto. The electrode is typically prepared from an electrode paste. For example, a cathodic paste can be prepared by combining from about 1 to about 20 weight percent of a conductive material, from about 35 to about 60 weight percent of a compatible cathodic material, from about 10 to about 50 weight percent of an electrolytic solvent and from about 5 to 30 weight percent of a cathode prepolymer all based on the total weight of the cathode paste.

Suitable conductive materials include by way of example, carbon powder, graphite, powdered nickel, metal particles, conductive polymers (i.e., characterized by a conjugated network of double bonds like polypyrol and polyacetylene), and the like.

Suitable cathode prepolymers are well known in the art and preferably are alkali or alkaline earth metal ion conducting. Suitable cathode prepolymers include, by way of example, propylene oxide, ethyleneimine, ethylene oxide, epichlorohydrin, acryloyl-derivatized polyalkylene oxides (as disclosed in U.S. Pat. No. 4,908,283), urethane acrylates, vinyl sulfonate polyalkylene oxides (as disclosed in U.S. Pat. No. 5,262,253 which patent is incorporated herein by reference in its entirety), and the like as well as mixtures thereof.

The cathode paste can optionally contain film forming agents which are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the cathode composition.

The cathode paste so formed is preferably heat treated prior to application onto the current collector by exposing the paste to an elevated temperature as described in U.S. Ser. No. 07/968,203 filed concurrently herewith as Attorney Docket No. 1116 and entitled "METHODS FOR ENHANCING THE COATABILITY OF CARBON PASTES TO SUBSTRATES" which application is incorporated herein by reference in its entirety. Preferably, the temperature employed to heat treat the paste is from about 60° to about 130° C. and more preferably from about 80° to about 90° C. Preferably, the paste is heated for a period of from about 0.1 to about 2 hours, more preferably from about 0.1 to about 1 hour, and even more preferably from about 0.2 to about 1 hour. In a particularly preferred embodiment, the paste is heat treated at from about 80° to about 90° C. for about 0.33 to about 0.5 hours.

The electrolytic solvent employed in the cathode paste is not critical but preferably is a 10:1 to 1:10 mixture of ethylene and/or propylene carbonate to triglyme. Preferred mixtures include a 4:1 mixture of ethylene and/or propylene carbonate to triglyme and a 1:1 mixture of ethylene and/or propylene carbonate to triglyme. See, for example, U.S. Ser. No. 07/918,509 filed Jul. 22, 1992 which is incorporated herein by reference in its entirety.

Anode pastes can also be prepared using known methods. Anode pastes can comprise from about 1 to about 20 weight percent of a conductive material, from about 35 to about 60 weight percent of a compatible anodic material, from about 10 to about 50 weight percent of an electrolytic solvent and from about 5 to about 30 weight percent of an anode prepolymer (similar to cathode prepolymers) all based on the total weight of the paste.

As described above, the electrode paste (i.e., the cathode or anode paste) is then applied onto the surface of the layer of electrically-conducting adhesion-promoter which, in turn, is found on the surface of a conductive plastic foil. The electrode paste is then cured to provide for the solid electrode.

When the electrode paste is a cathode paste, it is preferably applied onto the layer of electrically-conducting adhesion-promoter at a rate to give, after curing, a substantially uniform coating thickness of from about 20 to about 150 microns. Similarly, when the electrode paste is an anode paste, it is preferably applied onto the layer of electrically-conducting adhesion-promoter at a rate to give, after curing, a substantially uniform coating thickness of from about 20 to about 150 microns.

Curing is generally accomplished by conventional techniques to form a solid electrode. For example, suitable curing methods include heating, irradiation with electron beams (EB), etc. When the composition is cured by heating, the composition preferably contains an initiator. For example, heat curing initiators are typically peroxides such as benzoyl peroxide, methyl ethyl ketone peroxide, t-butyl peroxypyvarate, diisopropyl peroxycarbonate, and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In either case, the resulting cured electrode is a solid, homogeneous, single-phase material which is maintained upon curing, and does not readily separate upon cooling to temperatures below room temperature. See, for example, U.S. Pat. No. 4,925,751 which is incorporated herein by reference in its entirety.

Accordingly, the resulting product is a composite containing a conductive plastic foil which functions as a current collector, a layer of electrically-conducting adhesion-promoter, and a composite electrode (i.e., a composite cathode or composite anode) wherein the layer of electrically-conducting adhesion-promoter is interposed between the foil and the electrode.

As an additional matter, it is preferable to avoid the use of any protic materials which will be incorporated into the battery. For example, most of the protic inhibitors in di- and triacrylate prepolymers as well as in the urethane acrylate prepolymers are preferably removed prior to formation of the layer of electrically-conducting adhesion promoter, the composite electrode and/or the electrolyte. In this regard, removal of these inhibitors down to a level of less than 50 parts per million (ppm) can be accomplished by contacting these monomers and prepolymers with an inhibitor remover. Suitable inhibitor removers are commercially available.

An electrochemical cell is then formed using the current collector/electrode so formed. For example, if the electrode is a composite cathode, then the electrochemical cell is formed by combining the cathode with an anode and an electrolyte interposed therebetween.

Preferably, the electrochemical cell employs a solid, homogeneous, single-phase electrolyte which is maintained upon curing, and which does not readily separate upon cooling to temperatures below room temperature. See, for example, U.S. Pat. No. 4,925,751 which is incorporated herein by reference in its entirety. Such solid, single phase electrolytic compositions are formed from a liquid composition containing a polymerizable electrolyte prepolymers which upon curing provides for the solid, single phase material.

In this regard, the liquid electrolyte composition containing such prepolymers are preferably applied over a layer of cathode paste which itself is formed over a layer of electrically-conducting adhesion-promoter found on a conductive plastic foil. Both the cathode paste and the liquid electrolyte composition are preferably cured simultaneously by exposure to, for example, electron beams so as to provide for a cured composite containing both the cured cathode and the cured electrolyte. Alternatively, the liquid electrolyte can be applied to the cured cathode and then itself cured in a step separate from the cathode curing step.

The solid, single-phase electrolyte has a thickness of no more than about 250 microns ($\mu$m). Preferably, the solid, solvent-containing electrolyte has a thickness of from about 10 to about 250 microns, more preferably from about 25 to about 150 microns, and even more preferably from about 40–80 microns.

Utility

The electrically-conducting adhesion-promoter of this invention is useful in enhancing the adherence of the electrode to the current collector of an electrochemical cell. Specifically, the electrically-conducting adhesion-promoter is interposed between the electrode and the current collector. Because of its acid functionality, this adhesion-promoter effectively adheres to the current collector. Additionally, the surface of this layer of adhesion-promoter is characterized on a microscopic level by peaks and valleys which enhance the adhesion of the electrode to this layer.

The improved adherence of the conductive plastic foil to the electrode by the use of the electrically-conducting adhesion-promoter layer described herein is evidenced by the reduced rate at which the electrode paste separates from this layer during application as compared to the rate of separation arising from use of a conductive plastic foil without this layer. This improved adhesion of the electrode paste to the current collector by virtue of the interposed layer of electrically-conducting adhesion-promoter can be quantified as per ASTM test number D-3359-87.

Since this adhesion-layer is electrically-conducting, the current generated by the electro-chemical cell can pass through it and be collected by the conductive plastic foil acting as the current collector.

When the layer of electrically-conducting adhesion-promoter is preferably non-cation conducting, then migration of alkali or alkaline earth metal cations to the current collector is prevented. This, in turn, prevents potentially adverse interaction of such cations with the current collector (e.g., corrosion) which could reduce the useful life of the electrochemical cell.

The following examples are offered to illustrate the present invention and should not be construed in any way as limiting its scope.

EXAMPLES

EXAMPLE 1

An electrically-conducting, adhesive promoter is first formulated as a dispersed colliodal solution. The formulation for this example was as follows:

- 171 grams of carbon powder (Shawinigan Black—available from Chevron Chemical Company, San Ramon, Calif.)
- 2727 grams of distilled water
- 3250 grams of isopropanol
- 684 grams of a 25 weight percent solution of polyacrylic acid (average molecular weight of about 90,000, commercially available from Aldrich Chemical Company)

The carbon powder, water and isopropanol are mixed in a conventional high shear colloid mill mixer until the carbon is uniformly dispersed. At this point, the 25 weight percent solution of polyacrylic acid is added to the solution and mixed. If necessary, mixing can be enhanced by an ink mill and the degree of mixing quantified by use of a Hegman gauge.

The resulting mixture is roll coated onto a sheet of Southwall Silver Reflector Film (a conductive plastic film available from Southwall Technologies, Palo Alto, Calif.). A uniform coating is obtained. Evaporation of the solvents (i.e., water and isopropanol) provides for an electrically-conducting adhesion promoter layer of about 12 microns in thickness. In order to further remove the protic solvent from this layer, the foil can be redried. For example, redrying can be conducted by placement of the foil in an oven maintained at about 130° C. or more over a period of time (e.g., 12 to 24 hours).

EXAMPLE 2

A second electrically-conducting, adhesive promoter is formulated as a dispersed colliodal solution. The formulation for this example is as follows:

- 84.4 grams of carbon powder (Shawinigan Black T-M—available from Chevron Chemical Company, San Ramon, Calif.)
- 337.6 grams of a 25 weight percent solution of polyacrylic acid (average molecular weight of about 90,000, commercially available from Aldrich Chemical Company—contains about 84.4 grams polyacrylic acid and 253.2 grams water)
- 578 grams of isopropanol The carbon and isopropanol are mixed in a conventional high shear colloid mill mixer until the carbon is uniformly dispersed. At this point, the 25 weight percent solution of polyacrylic acid is added to the solution and mixed. The resulting mixture is roll coated with a Meyer rod onto a sheet of Southwall Silver Reflector Film, a conductive plastic film available from Southwall Technologies, Palo Alto, Calif. After application, the solution/foil are contacted with a Mylar wipe (about 0.002 inches thick by about 2 inches and by about 9 inches wide). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer.

In order to further remove the protic solvent from the layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably placed into a desiccator or other similar anhydrous environment to minimize atmospheric moisture content.

EXAMPLE 3

A third electrically-conducting, adhesive promoter is formulated as a dispersed colloidal solution. The formulation for this example is as follows:

- 84.4 grams of carbon powder (Shawinigan Black T-M—available from Chevron Chemical Company, San Ramon, Calif.)
- 64.4 grams of polyethylene oxide (MW about about 100,000, commercially available from Aldrich Chemical Company)
- 80.0 grams of a 25 weight percent solution of polyacrylic acid (average molecular weight of about 90,000, commercially available from Aldrich Chemical Company—contains about 20 grams polyacrylic acid and 60 grams water)
- 578 grams of isopropanol The carbon and isopropanol are mixed in a conventional high shear colloid mill mixer until the carbon is uniformly dispersed. At this point, the 25 weight percent solution of polyacrylic acid is added to the solution and mixed. The polyethylene oxide is then added and, if necessary, additional water is added to dissolve all of the polyethylene oxide. After mixing, the resulting mixture is roll coated with a Meyer rod onto a sheet of Southwall Silver Reflector Film. After application, the solution/foil is contacted with a Mylar wipe. The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer.

In order to remove additional protic solvent from the layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably placed into a desiccator or other similar anhydrous environment to minimize atmospheric moisture adsorption.

EXAMPLE 4

A fourth electrically-conducting, adhesive promoter is formulated as a polymer hot-melt. The formulation for this example is as follows:

- 84.4 grams of carbon powder (Shawinigan Black T-M—available from Chevron Chemical Company, San Ramon, Calif.)
- 64.4 grams of polyethylene oxide (MW about about 100,000, commercially available from Aldrich Chemical Company.
- 20.0 grams of stearic acid The polyethylene oxide is hot melted and then the carbon powder and stearic acid are mixed until uniformly dispersed. While maintaining a liquid state, the resulting mixture is extruded onto a sheet of Southwall Silver Reflector film. After extrusion, the foil is cooled to room temperature, preferably under anhydrous conditions, so as to provide for a solid, electrically-conducting, adhesion-promoter layer of about 10 microns in thickness on the foil. In order to avoid absorption of moisture from the atmosphere, the roll is preferably placed into a desiccator or other similar anhydrous environment to minimize atmospheric moisture adsorption.

EXAMPLE 5

A fifth electrically-conducting, adhesive promoter is formulated as a dispersed colloidal solution. The formulation for this example is as follows:

- 84.4 grams of carbon powder (Shawinigan Black T-M—available from Chevron Chemical Company, San Ramon, Calif.)
- 345.0 grams of a 25 weight percent solution of vinylsulfonic acid [commercially available from Aldrich Chemical Company as the sodium salt (337.6 grams) which is converted to the acid by contact with a concentrated HCl aqueous medium—contains about 84.4 grams vinylsulfonic acid, and balance water]
- 578 grams of isopropanol
- 578 grams of isopropanol The carbon and isopropanol are mixed in a conventional high shear colloid mill mixer until the carbon is uniformly dispersed. At this point, the 25 weight percent solution of polyvinyl sulfonic acid is added to the solution and mixed. If desired, the hydroquinone monomethyl ether inhibitor can be removed from the polyvinyl sulfonic acid prior to addition to the carbon/isopropanol mixture. Such removal is effected by contacting this solution with an Inhibitor Remover available as Product No. 31,133-2 from Aldrich Chemical, Milwaukee, Wis. which results in less than 50 ppm of inhibitor in the product.

The resulting colloidal suspension is then roll coated with a Meyer rod onto a sheet of Southwall Silver Reflector Film. After application, the solution/foil is contacted with a Mylar wipe. The wipe is flexibly engaged with the foil (i.e., the wipe merely contacted the foil) to redistribute the solution so as to provide for a substantially uniform coating.

The solvent is evaporated at about 110° to 120° C. via a conventional gas-fired oven and the remaining layer is then cured by continuously passing the foil through an electron beam apparatus (Electrocurtain, Energy Science Inc., Wolburn, Mass.) at a voltage of about 175 kV and a current of about 1.0 mA and at a conveyor belt speed setting of 50 which provides a conveyor speed of about 1 cm/sec so as to provide for an electrically-conducting adhesion-promoter layer on the foil.

In order to remove additional protic solvent from the layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably placed into a desiccator or other equivalent anhydrous solvent to minimize atmospheric moisture adsorbtion.

EXAMPLE 6

An electrically-conducting, adhesive promoter was first formulated as a dispersed colliodal solution. The formulation for this example was as follows:

- 25 lbs of carbon powder (Shawinigan Black—available from Chevron Chemical Company, San Ramon, Calif.)
- 18.5 lbs of isopropanol
- 100 lbs of a 25 weight percent solution of polyacrylic acid (average molecular weight of about 90,000, commercially available from Aldrich Chemical Company)

The carbon powder was mixed directly with the total amount of polyacrylic acid and 25% of the isopropanol (18.5 lbs). The mixture was stirred with a gear-motor "Lightin" mixer (model XJ-43—available from Mixing Equipment Co., Avon, N.Y.) at 720 rpms with two 5 inch diameter A310-type propellors mounted on a single shaft in a 30 gallon polyethylene drum which wets the carbon and eliminates any further dust problem. The resulting composition ("master batch") is 143.5 lb and contains some lumps.

The master batch was then mixed in an ink mill which consists of three steel rollers almost in contact with each other, turning at 275, 300 and 325 rpms, respectively. This high shear opertion allowed particles that were sufficiently small to pass directly through the rollers. Those that were not continued to be mixed until they can pass through the rollers. When mixing was completed, the the carbon was completely dispersed throughout the composition. A Hegman fineness of grind gauge (available from Paul N. Gardner Co., Pompano Beach, Fla.) indicates that the particles were typically about 4–6 $\mu$m in diameter with an ocassional particle of about 12.5 $\mu$m in diameter. Prolonged storage of the mixture did not result in carbon settling out or in reagglomeration.

Prior to roll coating this mixture, the remaining 75% of the isopropanol was mixed in, working with 5 gallon batches in a plastic pail. This was accomplished using an air powered shaft mixer (Dayton model 42231 available from Granger Supply Co., San Jose, Calif.) with a 4 inch diameter Jiffy-Mixer brand Impeller. Then, the mixture was gear-pumped through a 125 $\mu$m cloth filter.

At this point the mixture is Meyer-rod coated onto a conductive plastic substrate in a manner similar to that described in Example 2 above.

EXAMPLE 7

A current collector containing an electrically-conducting adhesion-promoter is prepared in the manner described in Example 2 above. A cathode paste is then applied to the surface of the electrically-conducting adhesion-promoter. The cathode paste is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon powder (from Chevron Chemical Company, San Ramon, Calif. under the tradename of Shawinigan Black TM). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 16 hours to provide a cathode powder having about 84.45 weight percent $V_6O_{13}$.

The polyethylene oxide is hot melted and then the carbon powder and stearic acid are mixed until uniformly dispersed. While maintaining a liquid state, the resulting mixture is extruded onto a sheet of Southwall Silver Reflector film. After extrusion, the foil is cooled to room temperature, preferably under anhydrous conditions, so as to provide for a solid, electrically-conducting, adhesion-promoter layer of about 10 microns in thickness on the foil. In order to avoid absorption of moisture from the atmosphere, the roll is preferably placed into a desiccator or other similar anhydrous environment to minimize atmospheric moisture adsorption.

EXAMPLE 5

A fifth electrically-conducting, adhesive promoter is formulated as a dispersed colloidal solution. The formulation for this example is as follows:

84.4 grams of carbon powder (Shawinigan Black T-M —available from Chevron Chemical Company, San Ramon, Calif.)

345.0 grams of a 25 weight percent solution of vinylsulfonic acid [commercially available from Aldrich Chemical Company as the sodium salt (337.6 grams) which is converted to the acid by contact with a concentrated HCl aqueous medium—contains about 84.4 grams vinylsulfonic acid, and balance water]

578 grams of isopropanol 578 grams of isopropanol

The carbon and isopropanol are mixed in a conventional high shear colloid mill mixer until the carbon is uniformly dispersed. At this point, the 25 weight percent solution of polyvinyl sulfonic acid is added to the solution and mixed. If desired, the hydroquinone monomethyl ether inhibitor can be removed from the polyvinyl sulfonic acid prior to addition to the carbon/isopropanol mixture. Such removal is effected by contacting this solution with an Inhibitor Remover available as Product No. 31,133-2 from Aldrich Chemical, Milwaukee, Wis. which results in less than 50 ppm of inhibitor in the product.

The resulting colloidal suspension is then roll coated with a Meyer rod onto a sheet of Southwall Silver Reflector Film. After application, the solution/foil is contacted with a Mylar wipe. The wipe is flexibly engaged with the foil (i.e., the wipe merely contacted the foil) to redistribute the solution so as to provide for a substantially uniform coating.

The solvent is evaporated at about 110° to 120° C. via a conventional gas-fired oven and the remaining layer is then cured by continuously passing the foil through an electron beam apparatus (Electrocurtain, Energy Science Inc., Wolburn, Mass.) at a voltage of about 175 kV and a current of about 1.0 mA and at a conveyor belt speed setting of 50 which provides a conveyor speed of about 1 cm/sec so as to provide for an electrically-conducting adhesion-promoter layer on the foil.

In order to remove additional protic solvent from the layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably placed into a desiccator or other equivalent anhydrous solvent to minimize atmospheric moisture adsorbtion.

EXAMPLE 6

An electrically-conducting, adhesive promoter was first formulated as a dispersed colliodal solution. The formulation for this example was as follows:

25 lbs of carbon powder (Shawinigan Black—available from Chevron Chemical Company, San Ramon, Calif.)

18.5 lbs of isopropanol 100 lbs of a 25 weight percent solution of polyacrylic acid (average molecular weight of about 90,000, commercially available from Aldrich Chemical Company)

The carbon powder was mixed directly with the total amount of polyacrylic acid and 25% of the isopropanol (18.5 lbs). The mixture was stirred with a gear-motor "Lightin" mixer (model XJ-43—available from Mixing Equipment Co., Avon, N.Y.) at 720 rpms with two 5 inch diameter A310-type propellors mounted on a single shaft in a 30 gallon polyethylene drum which wets the carbon and eliminates any further dust problem. The resulting composition ("master batch") is 143.5 lb and contains some lumps.

The master batch was then mixed in an ink mill which consists of three steel rollers almost in contact with each other, turning at 275, 300 and 325 rpms, respectively. This high shear opertion allowed particles that were sufficiently small to pass directly through the rollers. Those that were not continued to be mixed until they can pass through the rollers. When mixing was completed, the the carbon was completely dispersed throughout the composition. A Hegman fineness of grind gauge (available from Paul N. Gardner Co., Pompano Beach, Fla.) indicates that the particles were typically about 4–6 $\mu$m in diameter with an ocassional particle of about 12.5 $\mu$m in diameter. Prolonged storage of the mixture did not result in carbon settling out or in reagglomeration.

Prior to roll coating this mixture, the remaining 75% of the isopropanol was mixed in, working with 5 gallon batches in a plastic pail. This was accomplished using an air powered shaft mixer (Dayton model 42231 available from Granger Supply Co., San Jose, Calif.) with a 4 inch diameter Jiffy-Mixer brand Impeller. Then, the mixture was gear-pumped through a 125 $\mu$m cloth filter.

At this point the mixture is Meyer-rod coated onto a conductive plastic substrate in a manner similar to that described in Example 2 above.

EXAMPLE 7

A current collector containing an electrically-conducting adhesion-promoter is prepared in the manner described in Example 2 above. A cathode paste is then applied to the surface of the electrically-conducting adhesion-promoter. The cathode paste is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon powder (from Chevron Chemical Company, San Ramon, Calif. under the tradename of Shawinigan Black TM). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 16 hours to provide a cathode powder having about 84.45 weight percent $V_6O_{13}$.

The above mixing procedure is repeated until the entire sample is mixed so as to provide for 292 grams of cathode powder.

ii. Cathode Paste

A cathode paste is prepared by combining sufficient cathode powder to provide for a final product having 45 weight percent $V_6O_{13}$.

Specifically, about 28.71 grams of unground carbon powder (from Chevron Chemical Company, San Ramon, Calif. under the tradename of Shawinigan Black ™) is combined in a glove box [under dry (<10 ppm $H_2O$) argon at ambient temperature and pressure] with about 57.2 grams of a 1:1 mixture of ethylene carbonate/triglyme and the resulting composite is mixed under dry argon and at ambient temperature and pressure on a double planatory mixer (Ross #2 mixer available from Charles Ross & Sons, Company, Hauppag, N.Y.) at about 20 rpms until a paste is formed.

About 248.77 grams of a cathode powder prepared in a manner similar to that described above is added to the mixer along with an additional 57.2 grams of a 1:1 mixture of triglyme/ethylene carbonate and the resulting composite is mixed under dry argon and at ambient temperature and pressure on a double planatory mixer at about 20 rpms until a dry paste is formed.

About 5 grams of polyethylene oxide (number average molecular weight about 600,000 available as Polyox WSR-205 from Union Carbide Chemicals and Plastics, Danbury, Conn.), about 42.9 grams of polyethylene glycol diacrylate (PEGDA) (molecular weight about 400 available as SR-344 from Sartomer Company, Inc., Exton, Pa.) and containing less than about 50 ppm of inhibitor, and about 7.6 grams of ethoxylated trimethylpropane triacylate (TMPEOTA) (molecular weight about 450 available as SR-454 from Sartomer Company, Inc., Exton, Pa.) and containing less than about 50 ppm of inhibitor are added to about 57.2 grams of a 1:1 mixture of triglyme/ethylene carbonate and this mixture is added to the mixer.

The resulting slurry in the mixer is heated at about 65° C. while mixing for 2 hours at 60 rpms to provide for the cathodic paste which had the following approximate weight percent of components:

| | |
|---|---|
| $V_6O_{13}$ | 45 weight percent |
| Carbon | 10 weight percent |
| ethylene carbonate/triglyme | 34 weight percent |
| polyethylene oxide | 1 weight percent |
| polyethylene glycol diacrylate[1] | 8.5 weight percent |
| ethoxylated trimethylpropane triacrylate[1] | 1.5 weight percent |

[1]Inhibitor is removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin which results in less than 50 ppm of inhibitor in the product.

In an alternative embodiment, the requisite amounts of all of the cathodic materials other than the cathode powder can be combined to form a first mixture and this first mixture is combined with the cathode powder to form a second mixture. This second mixture is then thoroughly mixed to provide for the cathode paste.

The cathode paste prepared as above is then heat treated at about 85° C. for about 20 minutes so as to enhance its adhesiveness, its softness and its electrolytic solvent retention properties.

The cathode paste is then placed onto the surface of the electrically-conducting adhesion-promoter attached to the current collector prepared in Example 2. A Mylar cover sheet is then placed over the paste and the paste is spread to thickness of about 90 microns (μm) with a conventional plate and roller system and cured.by continuously passing the sheet through an electron beam apparatus (Electrocurtain, Energy Science Inc., Wolburn, Mass.) at a voltage of about 175 kV and a current of about 1.0 mA and at a conveyor belt speed setting of 50 which provides a conveyor speed of about 1 cm/sec. After curing, the Mylar sheet is removed to provide for a solid cathode laminated to a nickel on nickel current collector.

B. Electrolyte

A solid electrolyte is prepared in the manner described in U.S. Ser. Nos. 07/918,508 and 07/918,509 both filed Jul. 22, 1992 and both of which are incorporated herein by reference. Specifically, about 137.48 grams of a 1:1 mixture of ethylene carbonate/triglyme and about 34.26 grams of urethane acrylate (available as Photomer 6140 from Henkel Corporation, Coating and Chemicals Division, Ambler, Pa.) are first combined. The resulting solution is passed through a column of Inhibitor Remover (available as Product No. 31,133-2 from Aldrich Chemical, Milwaukee, Wisc.) and then through a column of 4A molecular sieves to remove water.

This solution is then combined with about 5.02 grams of polyethylene oxide (number average molecular weight about 600,000 available as Polyox WSR-205 from Union Carbide Chemicals and Plastics, Danbury, Conn.). Once the polyethylene oxide is dispersed, about 23.24 grams of $LiAsF_6$ (available from FMC Corporation Lithium Division, Bessemer City, N.C., as Lectrosalt ™) is added while stirring with a laboratory mixer (Yamato Model LR41B, available from Fisher Scientific, Santa Clara, Calif.). Alternatively, the salt can be added before the polyethylene oxide (PEO) and then, after dissolution of the salt, the PEO can be added and stirred until dispersed.

The resulting 200 gram mixture contains the following weight percent of components:

ethylene carbonate 34.37 weight percent
triglyme 34.37 weight percent
polyethylene oxide 2.51 weight percent
urethane acrylate 17.13 weight percent
$LiAsF_6$ 11.62 weight percent The mixture is then thoroughly mixed with the same laboratory mixer at heating until a temperature of about 85° C. is reached and then cooled to ambient temperature over at least a 2 hour period while stirring is maintained. This mixture is then placed into a vacuum (at about 0.1 torr) for about 30 minutes.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Wolburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode which, in turn, is laminated to a nickel on nickel current collector.

C. Anode

The anode comprises a sheet of lithium foil (about 76 μm thick) which is commercially available from FMC Corporation Lithium Division, Bessemer City, N.C.

D. The Solid Battery

A sheet comprising a solid battery is prepared by laminating the lithium foil anode to the surface of the electrolyte in the sheet produced in step C above. Lamination is accomplished by minimal pressure.

The above examples are illustrative of this invention. It being understood, however, that this invention is not limited to these examples and that equivalent materials can be substituted therein. For example, polymers other than polyacrylic acid, polyoxyethylene oxide, and polyvinyl sulfonic acid used in the electrically-conducting adhesion-promoter layer such as maleic anhydride grafted polymers (e.g., polybutene, polypropylene, or copolymers of polyethylene and methyl acrylates, and the like), copolymers of acrylic acid with other solid matrix forming monomers (e.g., ethylene, propylene, butylene, and the like), etc. can be used in these examples by mere substitution for the polymer so used.

Likewise, other non-polymeric acid containing components can be used in place of stearic acid in Example 4 by mere substitution for the stearic acid so used. Such other non-polymeric acid containing components include, by way of example, abietic acid, decanoic acid, linolenic acid, palmitic acid, oleic acid, succinic acid, maleic acid, menadiol diphosphoric acid, phthalic acid, and 1-hexadecane sulfonic acid.

Still further, other conductive materials can be used in place of the Shawinigan Black ™ carbon powder used in the above examples by mere substitution for the carbon powder so used. Such other conductive materials include, by way of example, graphite, powdered nickel, metal particles, conductive polymers (i.e., characterized by a conjugated network of double bonds like polypyrol and polyacetylene), and the like.

What is claimed is:

1. An electrode/current collector composite comprising:
    a conductive plastic foil suitable for use as a current collector;
    a layer of a solid polymeric matrix, electrically-conducting, adhesion-promoter formed on at least one surface of the foil which comprises from about 30 to 80 weight percent of a conductive material; from about 20 to about 70 weight percent of a polymer derived from a solid matrix forming monomer or partial polymer thereof; and an effective amount of acid functionalities so as to enhance the adherence of this layer of electrically-conducting adhesion-promoter to the surface of the foil; and
    a composite electrode paste selected from the group consisting of a cathode paste and an anode paste,
    wherein the cathode paste comprises from about 1 to about 20 weight percent of a conductive material, from about 35 to about 60 weight percent of a compatible cathodic material, from about 10 to about 50 weight percent of an electrolytic solvent and from about 5 to 30 weight percent of a cathode prepolymer all based on the total weight of the paste, and
    further wherein the anode paste comprises from about 1 to about 20 weight percent of a conductive material, from about 35 to about 60 weight percent of a compatible anodic material, from about 10 to about 50 weight percent of an electrolytic solvent and from about 5 to about 30 weight percent of an anode prepolymers all based on the total weight of the paste wherein said adhesion-promotor is interposed between said plastic foil and said composite electrode.

2. The electrode/current collector according to claim 1 wherein said composite electrode is a composite cathode.

3. The electrode/current collector according to claim 1 wherein said composite electrode is a composite anode.

* * * * *